United States Patent [19]

Liu

[11] Patent Number: 4,622,359

[45] Date of Patent: Nov. 11, 1986

[54] POLYCARBONATE FILM COMPOSITION EXHIBITING A LOW KINETIC COEFFICIENT OF FRICTION AND COMPRISING GLASS PARTICLES AND FATTY ACID

[75] Inventor: Ping Y. Liu, Naperville, Ill.

[73] Assignee: General Electric Company, Mt. Vernon, Ind.

[21] Appl. No.: 767,370

[22] Filed: Aug. 20, 1985

[51] Int. Cl.$^4$ .............................................. C08L 69/00
[52] U.S. Cl. .................................... 524/322; 524/611
[58] Field of Search ............................... 524/322, 611

[56] References Cited

U.S. PATENT DOCUMENTS

| 3,424,703 | 1/1969 | Jones | 524/611 |
| 4,408,000 | 10/1983 | Lee | 524/611 |
| 4,409,351 | 10/1983 | Lee | 524/611 |
| 4,460,733 | 7/1984 | Carter et al. | 524/611 |

FOREIGN PATENT DOCUMENTS 179653  10/1984  Japan .................................. 524/322

*Primary Examiner*—Harold D. Anderson
*Attorney, Agent, or Firm*—Myron B. Kapustij; Martin B. Barancik

[57] ABSTRACT

An improved aromatic carbonate resin film forming composition exhibiting improved kinetic coefficient of friction comprising, in physical admixture, at least one aromatic carbonate resin and glass particles, the improvement comprising said composition containing at least one fatty acid in an amount effective to reduce the kinetic coefficient of friction of said carbonate resin.

32 Claims, No Drawings

POLYCARBONATE FILM COMPOSITION EXHIBITING A LOW KINETIC COEFFICIENT OF FRICTION AND COMPRISING GLASS PARTICLES AND FATTY ACID

BACKGROUND OF THE INVENTION

Polycarbonate resin films, due to their many advantageous properties, are used in many industrial and commercial applications. Polycarbonate resin films, such as for example those derived from 2,2-bis(4-hydroxyphenyl)propane and phosgene, exhibit excellent optical clarity, high dimensional stability, excellent color, high heat resistance, and a high resistance to oxidative degradation.

However, polycarbonate films possess a very high film-to-film kinetic coefficient of friction. This makes handling of polycarbonate films difficult and restricts the use of such films in automatic processing equipment, such as for example packaging equipment, where successful operations necessitate kinetic coefficients of film friction considerably lower than those exhibited by conventional polycarbonate resin films. One effort to produce polycarbonate resin compositions which provide a self-sustaining film exhibiting a commercially acceptable coefficient of friction is described in U.S. Pat. No. 3,424,703. This patent describes a polycarbonate composition containing a polycarbonate resin having intimately dispersed therein a particular modifier which may be either silica or talc and which has an average diameter of up to about 10 microns and which is present in an amount of from about 0.025 to about 0.50 weight percent.

It has been surprisingly discovered that a modifier comprised of glass particles and certain critical amounts of a fatty acid results in polycarbonate resin films which exhibit quite low kinetic coefficients of friction.

SUMMARY OF THE INVENTION

The instant invention is directed to a polycarbonate film-forming composition exhibiting a quite low kinetic coefficient of friction. More particularly, this invention is directed to an aromatic polycarbonate resin film forming composition comprising an aromatic carbonate resin and an amount effective to improve or lower the kinetic coefficient of friction of said carbonate resin of a modifier comprised of glass particles and a fatty acid.

DESCRIPTION OF THE INVENTION

It has now been surprisingly discovered that when a modifier comprised of a combination of glass particles and certain critical amounts of a fatty acid is added to a polycarbonate resin within certain concentrations the resultant composition may be used to provide a thin, e.g., 10 mils or less, self-sustaining film having a kinetic coefficient of friction considerably lower than that of a film formed of the unmodified polycarbonate, and less than that of a polycarbonate modified by the glass particles alone. Quite importantly, the films prepared in accordance with this invention continue to exhibit the quite excellent optical properties which are comparable to unmodified polycarbonate films.

The polycarbonate resins utilized in the instant invention are well known in the art and are generally commercially available or may be readily prepared by known conventional methods. The polycarbonates, as well as methods for their preparation, are described, inter alia, in U.S. Pat. Nos. 3,161,615, 3,220,973, 3,312,659, 3,312,660, 3,313,777, 3,666,614 and 3,989,672, all of which are incorporated herein by reference. The polycarbonates may be conveniently prepared by the reaction of at least one dihydric phenol with a carbonate precursor via the interfacial polymerization process. Typically, the dihydric phenols utilized may be represented by the general formula

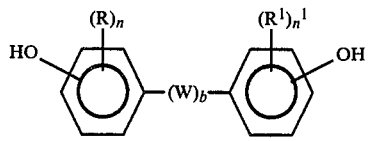

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals,

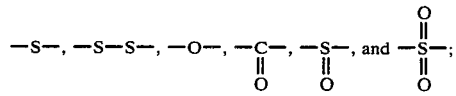

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl, and alkaryl radicals. The preferred alkyl radicals are those containing from 1 to about 10 carbon atoms. The preferred cycloalkyl radicals are those containing from 4 to about 8 ring carbon atoms. The preferred aryl radicals are those containing from 6 to 12 ring carbon atoms, i.e., phenyl, biphenyl, and naphthyl. The preferred aralkyl and alkaryl radicals are those containing from 7 to about 14 carbon atoms.

The preferred halogen radicals represented by R and $R^1$ are chlorine and bromine.

The hydrocarbonoxy radicals represented by R and $R^1$ may be represented by the formula $-OR^3$ wherein $R^3$ has the same meaning as R. The preferred hydrocarbonoxy radicals are the alkoxy and aryloxy radicals.

The divalent hydrocarbon radicals represented by W include the alkylene, alkylidene, cycloalkylene, and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 4 to about 16 ring carbon atoms.

Some illustrative non-limiting examples of suitable dihydric phenols include:
2,2-bis(4-hydroxyphenyl)propane;
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)cyclododecane;
1,1-bis(4-hydroxyphenyl)dodecane;
4,4'-thiodiphenol;
bis(4-hydroxyphenyl)methane; and 2,2-bis(4-hydroxyphenyl)pentane.

Other useful dihydric phenols are also available and are described, inter alia, in U.S. Pat. Nos. 2,999,835, 3,028,365 and 3,334,154, all of which are incorporated herein by reference.

It is, of course, possible to employ a mixture of two or more different dihydric phenols in the preparation of the polycarbonates of the instant invention.

The carbonate precursors employed in the instant invention may be a carbonyl halide, a carbonate ester, or a bishaloformate. The carbonyl halides which may be employed are carbonyl bromide, carbonyl chloride and mixtures thereof. Typical of the carbonate esters which may be employed are the diaryl carbonates such as diphenyl carbonate; di(halophenyl)carbonates such as di(chlorophenyl)carbonate, di(bromophenyl)carbonate, and di(trichlorophenyl) carbonate; di(alkylphenyl)carbonates such as di(tolyl)carbonate; di(naphthyl)carbonate; di(chloronaphthyl)carbonate; phenyl tolyl carbonate; and chlorophenyl chloronaphthyl carbonate. The bishaloformates suitable for use as carbonate precursors include the bishaloformates of dihydric phenols such as the bishaloformates of hydroquinone, bishaloformates of bisphenol-A; bishaloformates of glycols such as the bis-haloformates of ethylene glycol, neopentyl glycol, and polyethylene glycol. While other carbonate precursors will occur to those skilled in the art, carbonyl chloride, also known as phosgene, is the preferred carbonate precursor.

Also included within the scope of the instant polycarbonates are the copolyester-carbonate resins. These copolyester-carbonate resin are derived from at least one dihydric phenol, a carbonate precursor, and at least one ester precursor such as a difunctional carboxylic acid or an ester forming reactive derivative thereof. These copolyester-carbonates, as well as methods for their preparation are described, inter alia, in U.S. Pat. No. 3,169,121, which is hereby incorporated herein by reference.

The modifier which is effective in improving the coefficient of kinetic friction of the instant polycarbonate film is comprised of, in combination, silica or glass particles and at least one fatty acid.

The silica or glass particles can be in the form of fine particles or beads having average diameters of 10 microns or less. Preferred particles are those which are spherical in shape, for example glass beads. The silica can be, for example $SiO_2$. The glass can be silica or any commercially available glass beads such as, for example, those available from Potters Industries Inc. under the tradename SPHERIGLASS 5000 (refractive index of 1.51–1.52, specific gravity of 2.45–2.50, and a specific composition of 72.5% $SiO_2$, 0.4% $Al_2O_3$, 13.7% $Na_2O$, 0.2% $FeO/Fe_2O_3$, 9.8% MgO, and 0.1% $K_2O$).

The fatty acids utilized in the instant invention are well known materials which are generally commercially available or may be readily prepared by known methods. The fatty acids useful in the instant invention are those containing from about 14 to about 26, preferably from about 16 to about 22, carbon atoms. They may be saturated or monolefinically unsaturated, although the predominately saturated fatty acids are preferred. Quite useful fatty acid may be represented by the formula $$CH_3-(CH_2)_r-COOH \qquad \text{II}$$

wherein r is an integer having a value of from about 12 to about 24, preferably from about 14 to about 20.

Some illustrative non-limiting examples of fatty acids useful in the instant invention include arachadic acid, behenic acid, palmitic acid, stearic acid, and oleic acid.

It is to be understood that mixtures of two or more different fatty acids as well as individual fatty acids may be used in the practice of the instant invention.

The amounts of modifiers, i.e., silica or glass and fatty acids, added to the aromatic carbonate polymer are amounts which, in combination, are effective to improve the kinetic coefficient of friction of the films. Generally, the amount of silica or glass particles added to the aromatic carbonate polymer is from about 0.025 to about 0.6 weight percent, preferably from about 0.15 to about 0.5 weight percent. Weight percent of silica or glass particles is based on the total amounts of the modifiers and aromatic carbonate polymer present. Generally, when the amount silica or glass particles is less than about 0.025 weight percent the improvement in kinetic coefficient of friction is not detectable. Where the amount exceeds about 0.6 weight percent the optical properties of the film are significantly deleteriously affected.

The amount of fatty acid present in the instant compositions is critical. If too little fatty acid is present there is no significant improvement in the kinetic coefficient of friction over that of a composition which contains the glass or silica particles alone. If too much of the fatty acid is used the improvement in the kinetic coefficient of friction decreases or is adversely affected. These amounts are dependent upon and related to the amounts of glass or silica particles present in the composition. Generally, the amount of fatty acid is from about 5 to about 120 weight percent, based on the amounts of glass or silica particles present. This amount is effective to improve the kinetic coefficient of friction of the carbonate polymer film containing the glass or silica particles. If less than this amount of fatty acid is used there is generally no significant improvement in the kinetic coefficient of friction of the film over that containing the polycarbonate and the glass or silica particles. If more than this amount is used there is a decrease in the improvement of the kinetic coefficient of friction, i.e., the kinetic coefficient of friction begins to significantly increase. Preferably the amount of fatty acid present, based on the amount of silica or glass particles present, is from about 10 to about 100 weight percent, more preferably from about 20 to about 75 weight percent, and most preferably from about 30 to about 60 weight percent.

DESCRIPTION OF THE PREFERRED EMBODIMENT

In order that those skilled in the art may better understand the present invention the following examples are presented by way of illustration and not by way of limitation. In the examples all parts and percentages are on a weight basis as previously defined unless otherwise specified.

The following examples are outside the scope of the instant invention and are presented for comparative purposes only.

EXAMPLE 1

This example illustrates a film formed from a composition containing polycarbonate resin and 0.5 weight percent glass particles.

In 100 ml of methylene chloride there are dissolved 22 grams of polycarbonate resin[1] and to this solution is added 0.11 gram (0.5 weight %) of glass spheres[2]. This mixture is then solvent cast into a thin film having a thickness of about 5 mils. The kinetic coefficient of friction of this film is determined according to ASTM D-1894 and the results are set forth in Table I.
1. General Electric's LEXAN ® resin derived from bisphenol-A and phosgene.
2. Potters Industries, Inc. SPHEREIGLASS ® 5000.

EXAMPLE 2

The procedure of Example 1 is substantially repeated except that the glass is replaced with talc. The kinetic coefficient of friction of the cast film is determined and the results are set forth in Table I.

EXAMPLE 3

The procedure of Example 2 is substantially repeated except that the composition additionally contains 0.042 gram (38 weight percent based on the amount of talc) of behenic acid[3]. The coefficient of kinetic friction is determined and the results are set forth in Table I. 3. HYSTYRENE ® 9022, Humko Chemical Co.

The following examples illustrate films of the instant invention.

EXAMPLE 4

The procedure of Example 1 is substantially repeated except that the composition contains 0.028 gram (25 weight percent based on the amount of glass) behenic acid. The kinetic coefficient of friction is determined and the results are set forth in Table I.

EXAMPLE 5

The procedure of Example 1 is substantially repeated except that the composition contains 0.042 gram (38 weight percent of glass) behenic acid. The kinetic coefficient of friction of the cast film is determined and the results are set forth in Table I.

EXAMPLE 6

The procedure of Example 1 is substantially repeated except that the composition contains 0.055 gram (50 weight percent of glass) behenic acid. The kinetic coefficient of friction of the cast film is determined and the results are set forth in Table I.

EXAMPLE 7

The procedure of Example 1 is substantially repeated except that the composition contains 0.11 gram (100 weight percent based on the amount of glass present) behenic acid. The kinetic coefficient of friction of the cast film is determined and the results are set forth in Table I.

EXAMPLE 8

In 100 ml of methylene chloride there are dissolved 22 grams of aromatic polycarbonate of the type used in Example 1 and 0.055 gram (100 weight percent based on the amount of glass particles present) behenic acid. To this solution there is added 0.055 gram (0.25 weight percent based on the amount of polycarbonate resin present) of glass particles of the type used in Example 1. This composition is then solvent cast into a thin film and the coefficient of kinetic friction of this film is determined. The results are set forth in Table I.

TABLE I

| Example No. | Particulate modifier | Amount of fatty acid (wt. % of glass or talc) | Kinetic Coefficient of Friction |
|---|---|---|---|
| 1 | glass | 0 | 0.70 |
| 2 | talc | 0 | 0.58 |
| 3 | talc | 38 | 0.69 |
| 4 | glass | 25 | 0.47 |
| 5 | glass | 38 | 0.37 |
| 6 | glass | 50 | 0.37 |
| 7 | glass | 100 | 0.44 |
| 8 | glass | 100 | 0.47 |

As illustrated by the data in Table I compositions containing both glass particles and a fatty acid (Examples 4–8) produce films which possess a lower kinetic coefiicient of friction than films produced from compositions containing only glass particles (Example 1). Furthermore, as shown by a comparison of Examples 2 and 3 the addition of a fatty acid to a composition containing talc is not effective in improving the kinetic coefficient of friction of this composition.

Examples 4–7 further illustrate that once an optimum concentration of fatty acid is reached the addition of more fatty acid does not further improve the kinetic coefficient of friction, but instead the inclusion of additional amounts of fatty acid tends to raise the kinetic coefficient of friction.

The present invention thus affords the production of thin, self-sustaining polycarbonate resin films which have good optical properties, e.g., haze values, and which are characterized by a much lower kinetic coefficient of friction than that exhibited by films prepared from polycarbonate compositions of the prior art. The films prepared from the compositions of the instant invention find wide utility as drafting films and in packaging and wrapping applications.

It is to be understood that the invention is not to be limited to the above examples or embodiments which are illustrative only. Obvious modfifications of the described compositions will be apparent to those skilled in the art.

What is claimed is:

1. An improved aromatic carbonate resin film forming composition exhibiting improved kinetic coefficient of friction comprising, in physical admixture, at least one aromatic carbonate resin and from about 0.025 to about 0.6 weight percent of glass particles in the form of fine particles, the improvement comprising said composition containing at least one fatty acid in an amount effective to reduce the kinetic coefficient of friction of said carbonate resin.

2. The composition of claim 1 wherein said amount of fatty acid is from about 5 to about 120 weight percent, based on the amount of glass particles present.

3. The composition of claim 2 wherein said amount of fatty acid is from about 10 to about 100 weight percent, based on the amount of said glass particles present.

4. The composition of claim 2 wherein said amount of fatty acid is from about 20 to about 75 weight percent.

5. The composition of claim 1 wherein said fatty acid is selected from fatty acids containing from about 14 to about 24 carbon atoms.

6. The composition of claim 5 wherein said fatty acid contains from about 16 to about 22 carbon atoms.

7. The composition of claim 6 wherein said fatty acid is a saturated fatty acid.

8. The composition of claim 7 wherein said fatty acid is behenic acid.

9. The composition of claim 1 wherein said aromatic carbonate is polycarbonate.

10. The composition of claim 9 wherein said aromatic polycarbonate resin contains the reaction products of at least one dihydric phenol and a carbonate precursor.

11. The composition of claim 10 wherein said dihydric phenol is bisphenol-A.

12. The composition of claim 11 wherein said carbonate precursor is phosgene.

13. The composition of claim 1 wherein said aromatic carbonate resin is a copolyester-carbonate resin.

14. The composition of claim 13 wherein said aromatic copolyester-carbonate resin contains the reaction products of at least one dihydric phenol, a carbonate precursor, and at least one ester precursor.

15. The composition of claim 13 wherein said dihydric phenol is bisphenol-A.

16. The composition of claim 15 wherein said carbonate precursor is phosgene.

17. The composition of claim 16 wherein said ester precursor is selected from isophthaloyl dihalides, terephthaloyl dihalides, and mixtures thereof.

18. A thin, self-sustaining aromatic carbonate film of the composition of claim 1.

19. A thin, self-sustaining aromatic carbonate film of the composition of claim 2.

20. A thin, self-sustaining aromatic carbonate film of the composition of claim 3.

21. A thin, self-sustaining aromatic carbonate film of the composition of claim 4.

22. A thin, self-sustaining aromatic carbonate film of the composition of claim 5.

23. A thin, self-sustaining aromatic carbonate film of the composition of claim 6.

24. A thin, self-sustaining aromatic carbonate film of the composition of claim 7.

25. A thin, self-sustaining aromatic carbonate film of the composition of claim 8.

26. A thin, self-sustaining aromatic polycarbonate film of the composition of claim 10.

27. A thin, self-sustaining aromatic polycarbonate film of the composition of claim 11.

28. A thin, self-sustaining aromatic polycarbonate film of the composition of claim 12.

29. A thin, self-sustaining aromatic copolyester-carbonate film of the composition of claim 14.

30. A thin, self-sustaining aromatic copolyester-carbonate film of the composition of claim 15.

31. A thin self-sustaining aromatic copolyester-carbonate film of the composition of claim 16.

32. A thin, self-sustaining aromatic copolyester-carbonate film of the composition of claim 17.

* * * * *